May 7, 1940.  G. W. ELSEY  2,199,623
CONDUCTOR BENDING DIE
Filed June 15, 1936  6 Sheets—Sheet 1

INVENTOR
GEORGE W. ELSEY
BY
Spencer, Hardman and Fehr
ATTORNEYS

May 7, 1940.   G. W. ELSEY   2,199,623
CONDUCTOR BENDING DIE
Filed June 15, 1936   6 Sheets-Sheet 4

INVENTOR
GEORGE W. ELSEY
BY
Spencer, Hardman and Fehr
ATTORNEYS

May 7, 1940.   G. W. ELSEY   2,199,623
CONDUCTOR BENDING DIE
Filed June 15, 1936   6 Sheets-Sheet 5

INVENTOR
GEORGE W. ELSEY
BY
Spencer, Hardman and Ache
ATTORNEYS

Patented May 7, 1940

2,199,623

UNITED STATES PATENT OFFICE 2,199,623

CONDUCTOR BENDING DIE

George W. Elsey, Dayton, Ohio, assignor to General Motors Corporation, Detroit, Mich., a corporation of Delaware Application June 15, 1936, Serial No. 85,323

21 Claims. (Cl. 153—6)

This invention relates to the manufacture of induction motors and more particularly to the manufacture of rotors of the so-called squirrel cage type.

In a recently developed rotor for induction motors, straight conductor bars of copper or other good conductive material are inserted in the rotor core and the projecting conductor ends bent against the core ends thus anchoring the conductors to the core, and also binding the core laminae together in case the core is laminated. The bent conductor ends may then be short-circuited by any well known means such as conducting end rings which are in contact with the bent conductor ends. To obtain an ideal electrical connection between these conductor ends, however, they are bent into overlapping engagement with each other, then swedged tightly together and finally fused into integral end connectors.

It is an object of the present invention to provide a device for simultaneously and uniformly bending the projecting ends of skewed conductors in a rotor core against the adjacent core ends and more particularly into overlapping engagement with each other.

It is another object of the present invention to make provision in the device for swedging the overlapping conductor ends at each core end tightly together.

It is another object of the present invention to adapt the device for operation upon a laminated rotor core by making provision in said device for twisting the core laminae so as to skew the inserted conductors, and for compressing said laminae until the projecting ends of the skewed conductors are bent against their adjacent core ends sufficiently to hold the core laminae in their compressed state.

Further objects and advantages of the present invention will be apparent from the following description, reference being had to the accompanying drawings wherein a preferred embodiment of the present invention is clearly shown.

Figures 1, 2, 3, 4, 13:
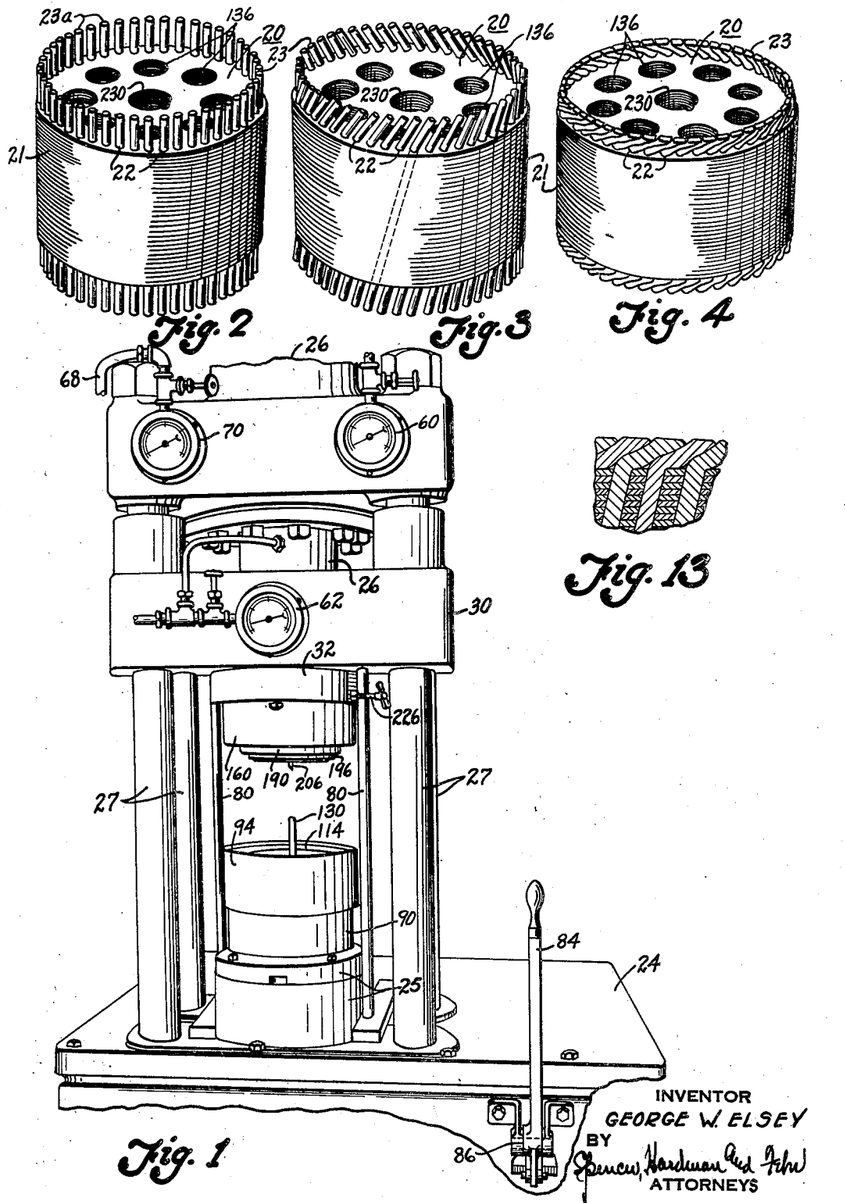
Fig. 1 is a fragmentary, perspective view of a device, embodying the present invention.
Figs. 2 to 4 inclusive, show progressive stages of the operation of the device upon a rotor core with inserted conductors.
Fig. 13 is an enlarged, fragmentary section through part of a completed rotor.

The present device is adapted to operate on the loosely assembled rotor 20, illustrated in Fig. 2. The laminated core 21 of this assembly is provided with circularly disposed and equi-angularly spaced holes 22, receiving in any suitable manner straight conductors 23 of copper or other good conducting material. To facilitate handling of the rotor assembly 20 and more particularly to prevent the conductors 23 from gravitating from the core 21 when held in the upright position shown in Fig. 2, the upper projecting conductor ends 23a are slightly bent in any feasible manner and preferably outwardly toward the core periphery. The operation of the present device on the rotor assembly 20 is initiated by twisting the loose laminae of the core in order to skew the conductors. Next, the laminae of the core are clamped tightly together, whereupon the bending of the projecting conductor ends takes place. For reasons to be explained later, the conductor ends at one core end start to bend prior to those on the opposite core end as is shown in Fig. 3. At the conclusion of the bending operation all conductor ends have been bent toward the core ends and form circular rings of overlapping conductor portions thereon. These circular rings are finally subjected to very high pressure in order to swedge the conductor portions tightly together, even to the extent of causing the metal of these conductor portions to flow (see Figs. 4 and 13) so that under no circumstances can the core laminae become loose after the clamping pressure is released.

Figures 5, 5A:
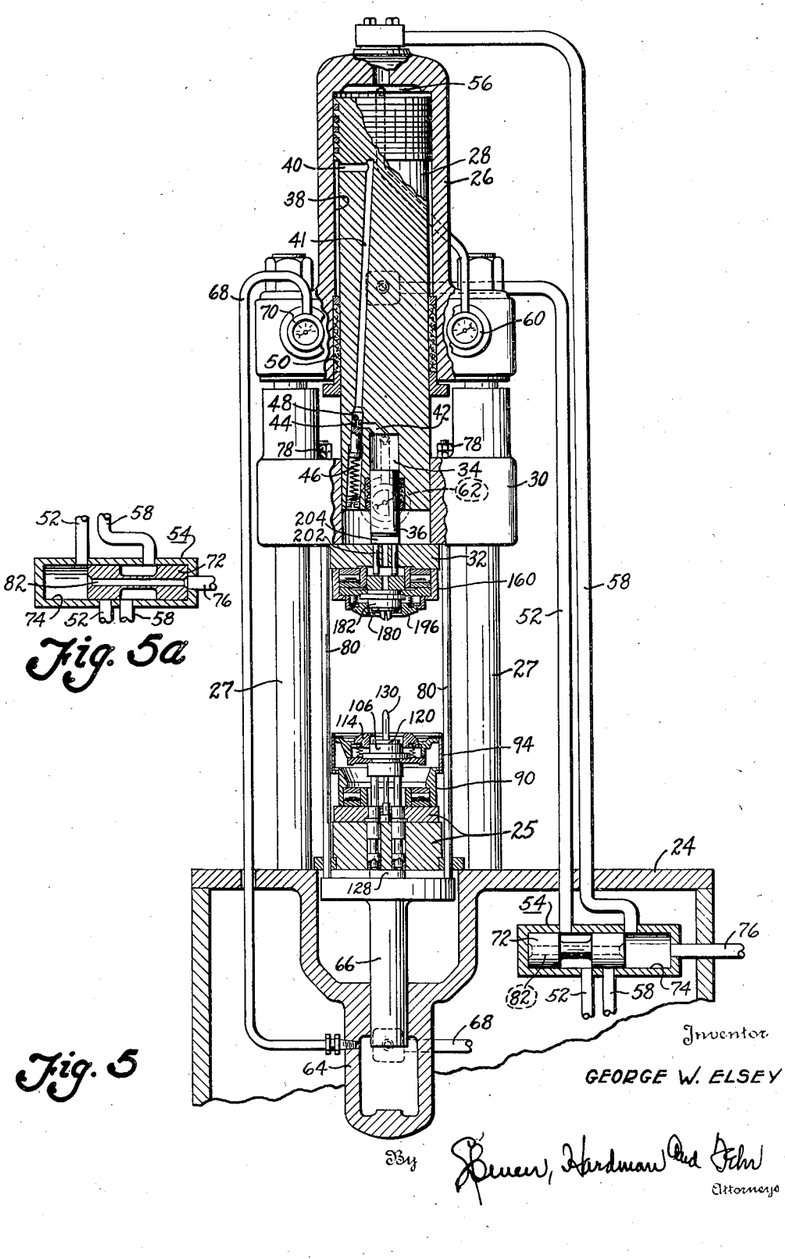
Fig. 5 is a partial section of the device.
Fig. 5a is a diagrammatic illustration of a valve which may be used in conjunction with the device.

Referring more particularly to Figs. 1 and 5, the present device incorporates any suitable base 24 on which is mounted in any suitable manner a lower die plate 25. A main cylinder 26 is mounted on columns 27 which rise from the base 24. Suitably secured to a ram 28 which is slidable in cylinder 26 is a carrier 30, guided for vertical movement by the columns 27 and carrying an upper die plate 32. Ram 28 provides a cylinder 34 in which a small ram 36 is slidable. One side 38 of the main cylinder 26 may communicate with cylinder 34 of the main ram 28 through suitable ducts 40, 41 and 42. A check valve 44 normally intercepts such communication under the compression of a loaded spring 46. This check valve 44 is provided with a passage 48 which will provide communication between ducts 41 and 42 upon depression of said valve under the pressure of fluid in cylinder-side 38 and ducts 40, 41. A suitable packing 50 seals cylinder side 38 which may communicate with any suitable supply of fluid pressure (not shown) through conduits 52 and a controller 54. The other side 56 of cylinder 26 may communicate with another supply of fluid pressure (not shown) through conduits 58 and controller 54. Mounted on the main cylinder 26 is a pressure gauge 60 which is suitably connected with cylinder-side 56 and indicates the pressure of the fluid therein at all times. Mounted on the carrier 30 is another pressure gauge 62 which is connected with cylinder 34 and indicates the pressure of the fluid therein. The base 24 provides a cylinder 64 in which a lower ram 66 is slidable. Fluid pressure from any suitable supply (not shown) may be in permanent communication with this cylinder through a conduit 68. The pressure of the fluid in cylinder 64 is indicated by a suitably connected pressure gauge 70 on the main cylinder 26.

Fluid pressure may be admitted to either side of cylinder 26 by the controller 54 which has a valve 72 slidably received in a valve body 74, provided with a drain-passage 76. In the position of the valve 72 shown in Fig. 5, fluid pressure from the supply is admitted past said valve and through conduits 52 to the lower side 38 of main cylinder 26, thus urging ram 28 into the home position shown in Fig. 5. The other cylinder side 56 is vented as appears clearly from Fig. 5. The home position of the ram 28 and attached carrier 30 is determined by stop nuts 78 on rods 80, suitably anchored to the lower ram 66 which, in home position, rests against the lower stationary die plate 25. Upon manually shifting the valve 72 from the position in Fig. 5 to that in Fig. 5a, fluid pressure from the other supply is admitted to cylinder side 56, whereas the lower cylinder side 38 is vented through conduit 52, a central passage 82 in valve 72 and drain-passage 76. It can also be understood from Figs. 5 and 5a, that one of the supplies of fluid pressure (neither shown but mentioned above) is necessarily intercepted by the valve 72 while the other fluid pressure supply is in communication with its proper cylinder side, and vice versa. Valve 72 may be shifted into either one of the positions shown in Figs. 5 and 5a by means of a hand lever 84 (Fig. 1) which is pivotally mounted at 86 to the base 24 and suitably connected to said valve. Of course, any other fluid pressure control for the various cylinders can be adapted without detriment to a successful operation of the mechanical structure of the illustrated device.

Figure 6:
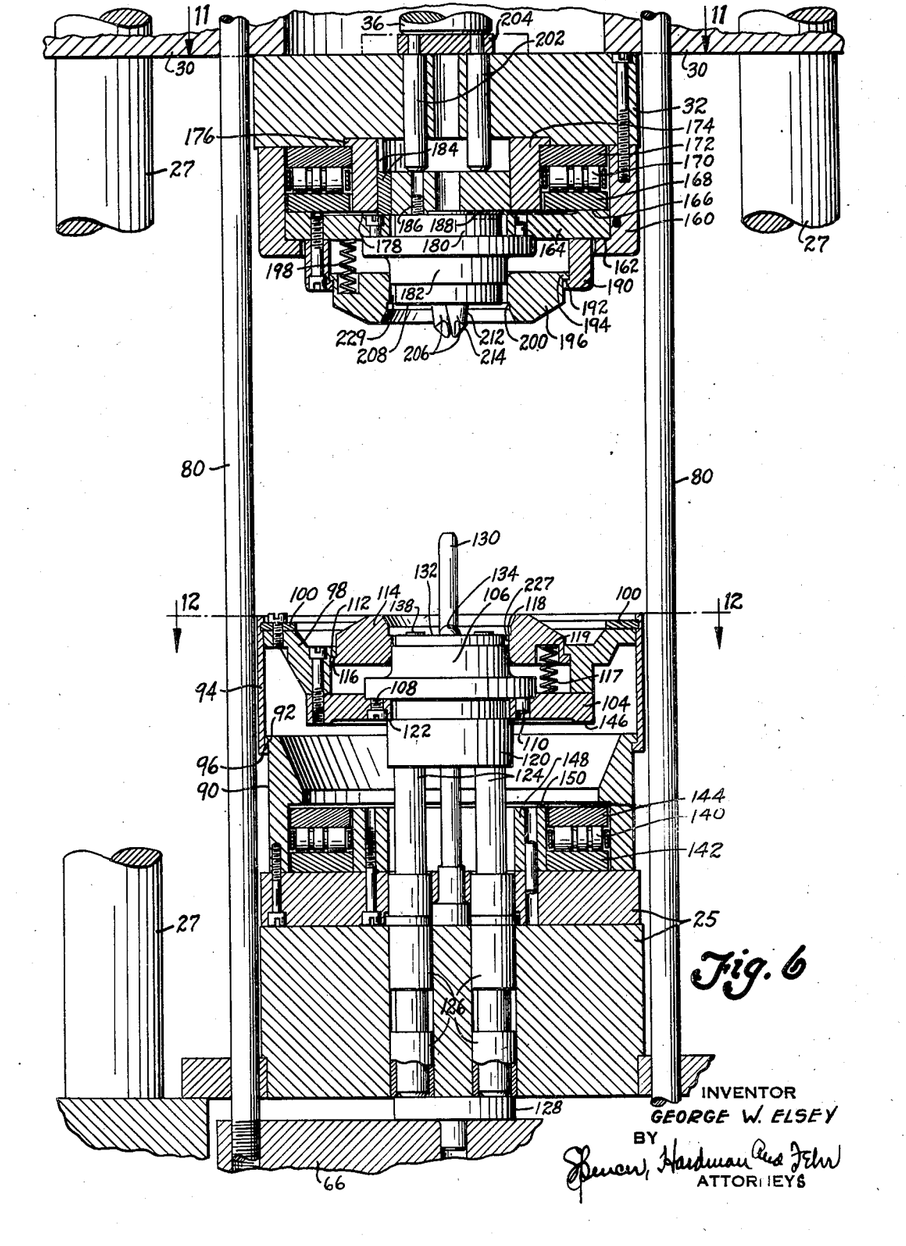
Fig. 6 is an enlarged fragmentary section through the device, certain movable elements thereof being shown in home position.
Figure 7:
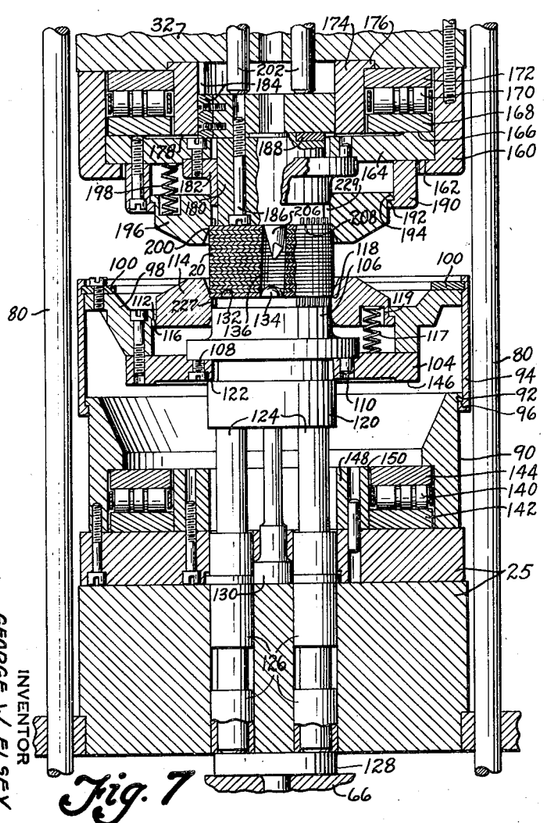
Figs. 7 to 10 inclusive, are sections similar to that of Fig. 6, however, showing certain movable elements of the device in different positions of operation.
Figure 8:
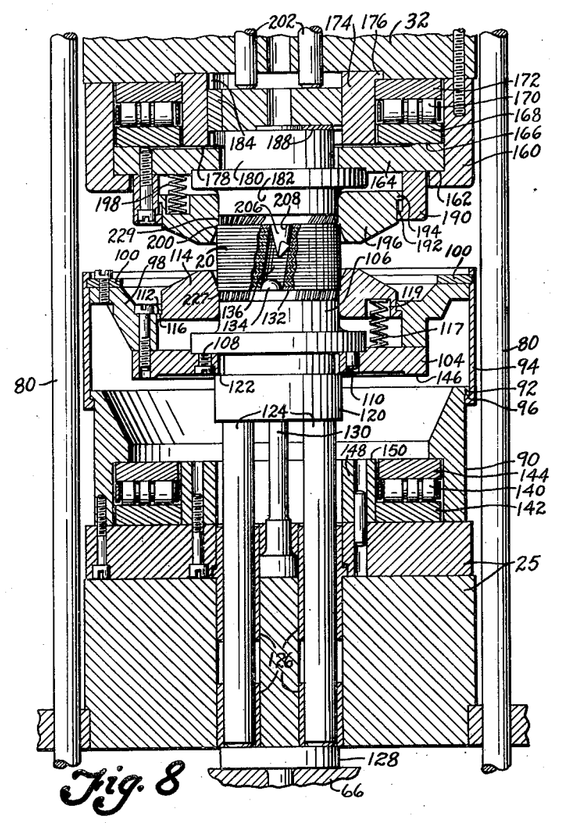
Figure 9:
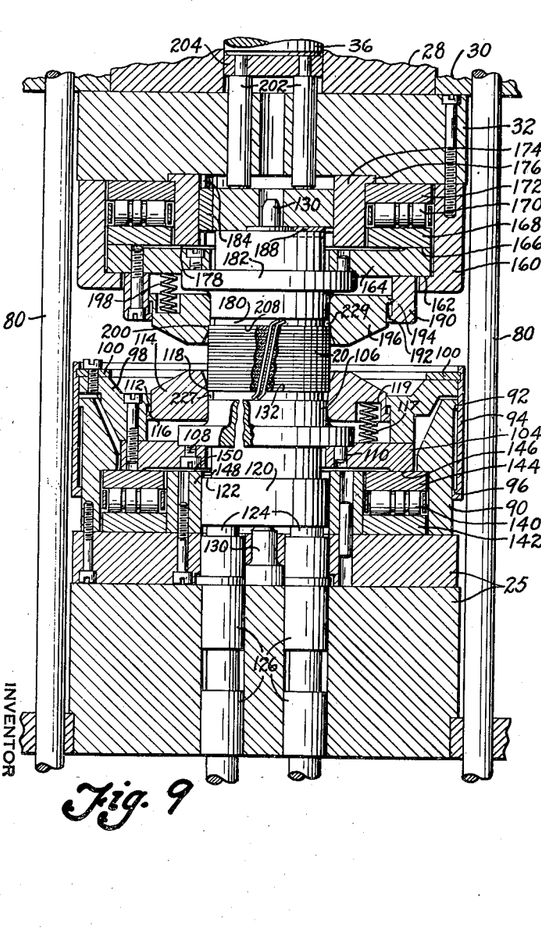
Figure 10:
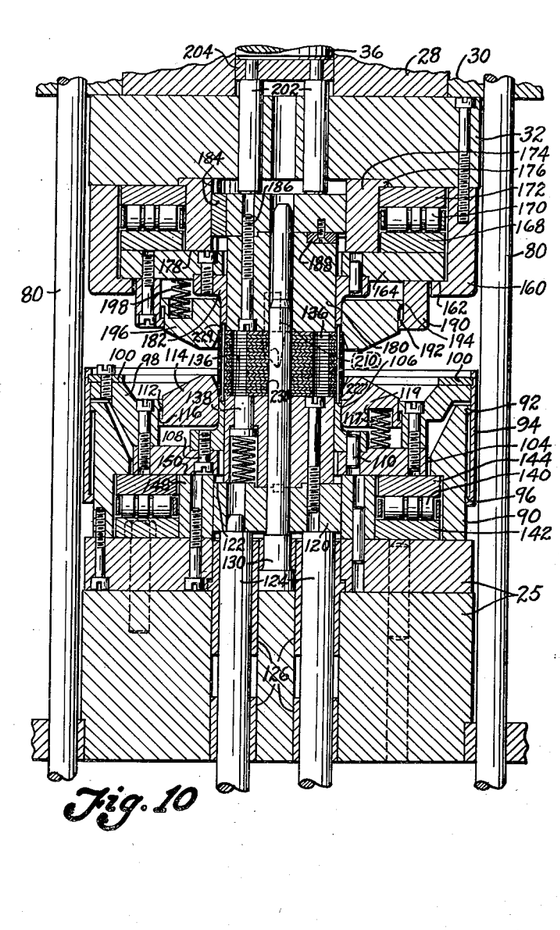
Figure 12:
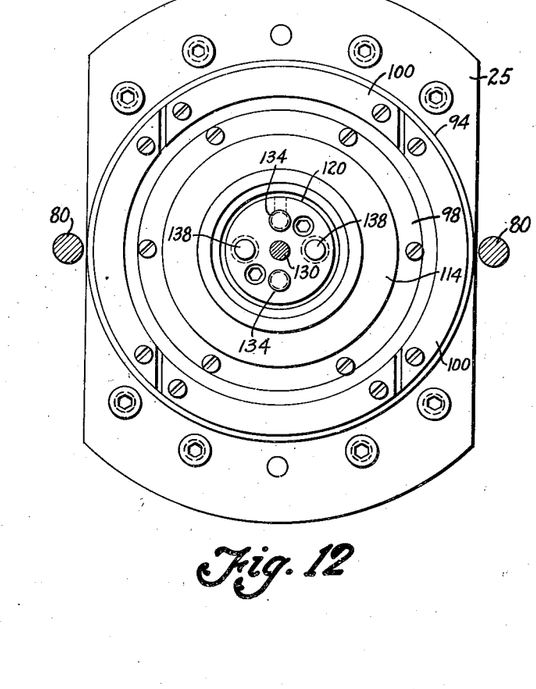
Fig. 12 is a section taken on the line 12—12 of Fig. 6.

Referring more particularly to Figs. 6 to 10, inclusive, a ring member 90 is mounted on the lower die plate 25 and provided with an annular shoulder 92. Slidable on this ring member 90 is a shell 94 which is also provided with an annular shoulder 96, engaging shoulder 92 of ring member 90 when said shell is in the home position shown in Fig. 6. A bracket 98 is mounted on shell 94 by a plurality of ring segments 100 in the manner illustrated in Figs. 6 and 12. This bracket 98 carries a ring member 104 to which a ring-shaped ram 106 is secured by screws 108 and dowel pins 110. Bracket 98 is also provided with an annular shoulder 112 and slidably receives a form die 114, having an annular shoulder 116 which is normally urged into engagement with shoulder 112 of bracket 98 by compression springs 117 which bear with one end against ring 104 and have their other end received in sockets 119 of form die 114. This form die 114 is also slidable on the ram 106 and has another annular shoulder 118, adapted to support the small margin of a rotor end surface which extends from the periphery of the rotor to the adjacent conductor ends as shown in Fig. 7. Slidable in the ram 106 is a clamp 120, having a shoulder 122 which is normally forced into engagement with ring 104 by means of rods 124 which are guided through bushings 126 in the lower die plate 25 and engaged at their lower ends by a thrust-transmitting pad 128 of the lower ram 66 (see also Fig. 5). Mounted in the lower die plate 25 is a pilot 130 which extends through the clamp 120 (see Fig. 10) and is of two different diameters, the diametrically smaller portion forming the tip of the pilot, whereas the diametrically larger portion forms the remainder of the pilot. As shown in Fig. 6, clamp 120 in home position has its rotor engaging surface 132 substantially flush with the annular shoulder 118 of support 114. Projecting from the clamp surface 132 are at least two semi-spherical locators 134 which are adapted to register with one or more weight-reducing and ventilation-affording openings 136 of a core 21 when placed on the clamp 120 and form die 114 as shown in Fig. 7. As best shown in Figs. 10 and 12, at least two diametrically opposite spring urged plungers 138 are carried by clamp 120 and normally project slightly beyond the surface 132 thereof as shown in Fig. 6. Mounted on the lower die plate 25 is a circular roller bearing 140, the lower race 142 of which rests on die plate 25 and the upper race 144 of which is in vertical alignment with an annular ridge 146 of ring 104. Further mounted on the lower die plate 25 is a thrust pad 148 in the form of a ring in which clamp 120 may enter. The top surface 150 of thrust pad 148 is substantially flush with the upper race 144 of roller bearing 140.

It follows from the foregoing description that an assembly, consisting of shell 94, bracket 98, ring 104 and ram 106, may rotate relative to the clamp 120, while forming die 114 may rotate independently of said assembly and of said clamp. Frictional engagement between the ring 104 and the compressed springs 117 obstructs relative rotation between the forming die 114 and the clamp 120 to some extent, as can be readily understood.

The upper die plate 32 carries a ring member 160, having an annular shoulder 162 against which rests a ring 164, having an annular ridge 166 which supports the lower race 168 of a circular roller-bearing 170, the upper race 172 of which abuts the adjacent die plate 32. A thrust pad 174 is anchored in the upper die plate 32 in the manner shown in Fig. 6, i. e. an annular flange 176 of said pad rests against the upper bearing race 172. The surface 178 of pad 174 is substantially flush with the lower bearing race 168. Slidable longitudinally in the thrust pad 174 is a clamp 180 which extends through an upper core clamp 182, suitably secured to the ring 164. Clamp 180 is prevented from rotating relative to the pad 174 by means of a key and groove connection 184 therebetween. Clamp 180 may consist of two parts, secured to each other by screws 186 and a key 188 as shown in Fig. 7. Attached to the ring 164 is a bracket 190, having an annular shoulder 192 against which the annular flange 194 of forming die 196 is urged by a plurality of compression springs 198. This die 196 fits also slidably over the ram 182 and is provided with a narrow, annular shoulder 200 which is in vertical alignment with the shoulder 118 of the lower companion die 114 and serves for the same purpose as the latter. Clamp 180 is normally forced into engagement with ring 164 by rods 202 which extend through die plate 32 and are in engagement with the ram 36 (see also Fig. 5) through an interposed thrust pad 204.

Figure 11:
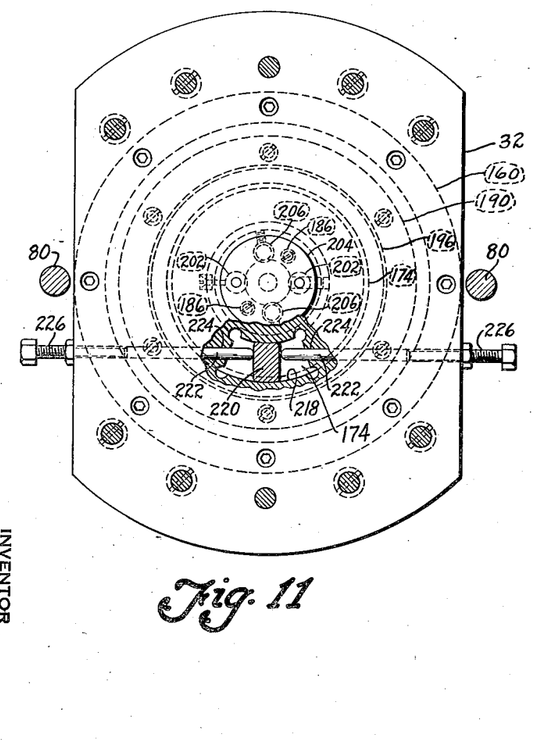
Fig. 11 is a section taken on the line 11—11 of Fig. 6.

One or preferably two diametrically opposite skewing pins 206 project from the core engaging surface 208 of clamp 180, the shanks 210 of said skewing pins being suitably secured in said clamp. Each one of the skewing pins 206 is provided with two differently inclined surfaces 212 and 214 which are adapted to twist the laminations of a rotor core 21 upon entry into aligned openings 136 thereof. As best shown in Fig. 11, die plate 32 is provided with an arcuate slot 218 into which extends a lug 220, integral with or suitably secured to the thrust pad 174. Two opposite sides of lug 220 are engaged by rods 222 which are received in suitable bores 224 of die plate 32. Threadedly received in said bores 224 are screws 226 which may be so manipulated as to cause a shifting of lug 220 in slot 218 through intermediation of the rods 222. By this provision angular adjustments of the thrust pad 174 and of the skewing pins 206 are possible. Thrust pad 174, clamp 180 and the skewing pins 206 are non-rotatable with respect to the die plate 32, except for angular adjustments, whereas ring 164 and ram 182 may be rotated. The forming die 196 is independently rotatable, but free rotation of said die relative to the ring 164 is to some extent obstructed by friction between said ring and the compressed springs 198.

Prior to an operation of the device, the operator places a loosely assembled rotor 20 on the lower clamp 120 by passing said rotor with its central hole 230 over the pilot 130. While thus placing a loose rotor assembly, the operator has to hold said assembly in the vertical position illustrated in Fig. 2, with the slightly bent conductor ends 23a at the top of the assembly to prevent the inserted conductors 23 from gravitating therefrom. In order that the core 21 of the assembly rests on the top surface 132 of the lower clamp 120, the operator turns the assembly until the nearest core openings 136 align with the locaters 134 and permit further descent of the assembly upon said clamp surface 132. The lower conductor ends of a thus located assembly project into an annular groove 227 which is formed by clamp 120, die 114 and ram 106. The operator may also initiate the skewing of the conductors by twisting the upper laminae of the core in the direction in which the skewing is to take place, so that the inclined surfaces 212 of the skewing pins 206 are solely relied on to complete the skewing operation. The device is now ready for operation and hand lever 84 is properly manipulated so as to shift valve 72 from the position shown in Fig. 5 to that shown in Fig. 5a to admit fluid pressure to the upper side 56 of the main cylinder 26 and to vent the lower side 38 of said main cylinder. Venting of, or pressure relief in the lower cylinder side 38 results in shifting of the check valve 44 into the intercepting position shown in Fig. 5, thus trapping the fluid pressure in cylinder 34, as can be readily understood. The admitted fluid pressure in cylinder side 56 causes the main ram 28 and attached carrier 30 to descend toward the located rotor assembly 20. The rate of descent of the main ram does not solely depend on the pressure of the admitted fluid in cylinder side 56 but is also partly determined by the smallest cross-sectional area of the vent passage.

While the main ram 28 and carrier 30 thus descend, the skewing pins 206 enter aligned core openings 136 and the inclined surfaces 212 complete the skewing operation by the time clamp 180 engages the loosely stacked laminae of the core 21 as shown in Fig. 7. During such descent of the carrier, the conductor ends at the top of the core project into an annular groove 229 which is formed by clamp 180, die 196 and ram 182. Continued descent of the main ram 28 and carrier 30 results in compression of the core laminae by the cooperating clamps 180 and 120, the latter remaining then stationary, because the pressure of the fluid which is permanently in communication with the lower cylinder 64 is greater than that of the trapped fluid in cylinder 34. After the core laminae are substantially compressed and upon continued descent of the carrier 30, ram 182 will descend relative to the clamp 180 and die 196 into engagement with the adjacent conductor ends, as can be readily understood from Fig. 8. Ram 182 exerts a considerable thrust against these conductor ends, causing the same to yield in a direction which offers the least resistance, i. e. the direction in which the conductors are skewed. The resistance of these conductor ends against yielding under the exerted thrust is smaller than the pressure of the fluid in cylinder 64. For that reason, the conductor ends yield while the lower clamp is in the home position shown in Figs. 6 to 8, inclusive. Considerable static friction develops between the engaged conductor ends and the ram, and assumes such a value that the ram 182 and attached ring 164 move with the yielding conductor ends, i. e. rotate on the roller bearing 170. The conductor ends may naturally yield only in the annular groove 229 in which they are confined. Due to the rotary support of ram 182, any knicking or battering down of the conductor ends by said ram is wholly eliminated as proved by inspection of conductor ends at various stages of the ram operation. The inspection showed that the conductor ends bend invariably where emerging from the rotor core rather than in the exposed length thereof. In view of the rotary support of ram 182, the static friction between the latter and the conductors assists in preventing, instead of occasioning, a knicking or battering-down of the conductor ends. Furthermore, this static friction between the rotary ram and the conductor ends induces a uniform and simultaneous bending of all conductor ends. As stated earlier, the conductor ends at the top of the rotor core start bending prior to those at the bottom. This is primarily caused by the considerable static friction between the skewed conductors and the compressed core laminae which resists transmission of the imparted thrust from the upper conductor ends to the lower conductor ends and instead directs said thrust into the core laminae, to be taken up by the lower clamp 120, as can be readily understood. The transmitted thrust is therefore utilized in bending only the upper conductor ends substantially until adjacent conductor ends engage each other and offer greater resistance against further bending. At this stage of the bending operation, the increasing thrust by the further descending ram 182 overcomes the pressure with which the lower clamp 120 is held in home position and depresses the same from the position shown in Fig. 8 to that shown in Fig. 10. During such depression of the lower clamp 120 and assembly 20 thereon, the central openings 230 of the core laminae are forced over the properly sized, diametrically larger portion of the pilot 130, whereby these openings are most accurately aligned with each other to afford a good seat on the rotor shaft which is to be inserted later. The slightest irregularity in size or shape of any of the core laminae will then show on the core periphery when compared with the other laminae as can be readily understood. To obtain a true cylindrical periphery the core periphery is subsequently ground after mounting of the motor shaft in the core. During such depression of the lower clamp 120, the descending ring 104 is seated against the lower roller bearing 140, thus stopping the lower ram 106 while the lower clamp and assembly thereon is still descending. The now stationary lower ram 106 exerts a thrust against the adjacent, skewed conductor ends and causes the same to bend into engagement with each other, however, in a direction opposite to that of the bent conductor ends on top of the core, as can be readily understood from the fact that the conductors are skewed. During the bending of the lower conductor ends, the bending ram 106 naturally rotates on its roller bearing 140 in the same manner as the previously described upper ram 182, thereby assuring uniform and simultaneous bending of the core. The bending of the lower conductor ends into engagement with each other is completed in the position of the device in Fig. 9.

The entire pressure of the fluid in the upper side 56 of main cylinder 26 can now exert itself against the bent conductor ends at both ends of the core. This pressure has been so selected that it causes a further slight descent of the upper ram into the position shown in Fig. 10, thereby swedging the bent conductor ends at both core ends together to such an extent that the metal of these conductor ends flows as shown in Fig. 13. These swedged conductor ends are as effective as rivet heads so that under no circumstances can the laminae become loose after the clamping pressure is later released. During the swedging and prior to the exertion of the maximum thrust by the upper ram 182 the rings 104 and 164 bend into engagement with the thrust pads 148 and 174, respectively, under the considerable thrust which is transmitted from the rams 106 and 182, respectively, through the central portions of said rings to the outer ridges thereof, thereby diverting the transmission of the maximum thrust from the roller bearings 140 and 170 to prevent excessive wear on these bearings. At the conclusion of the swedging operation, the operator manipulates control lever 84 so as to shift valve 72 from the position shown in Fig. 5a to that shown in Fig. 5 in order to cause return of all movable elements of the device into the home position shown in Figs. 5 and 6. After removal of a completed assembly 20 from the lower clamp 120, the operator places a new assembly thereon and starts another operation of the device.

The great success of the device hinges on the rotary supports for the bending rams 106 and 182, their incorporation is directly responsible for a uniform and simultaneous bending of the conductor ends and the total absence of any knicking or battering-down tendencies in these rams. Ingenious disposition of these rotary ram supports, i. e. the roller bearings 140 and 170, relative to the swedging-thrust transmitting pads 148 and 174, respectively, not only protects these bearings against wear by said swedging thrust but also permits of a greatest possible number of rollers to a bearing in the condensed construction of the device, thereby maintaining the maximum load on each roller at a minimum.

While the embodiment of the present invention as herein disclosed, constitutes a preferred form, it is to be understood that other forms might be adopted, all coming within the scope of the claims which follow.

What is claimed is as follows:

1. A device for anchoring inserted conductors to a laminated core comprising, in combination, a core support; means for skewing the laminations; means for compressing the core laminae together; and means for simultaneously bending protruding straight conductor ends against the adjacent core end and into contact engagement with each other.

2. A device for anchoring skewed inserted conductors to a laminated core having a central hole comprising, in combination, a core support; means for compressing the core laminae; means for accurately aligning the central holes of all core laminae; and means for simultaneously bending protruding straight conductor ends against the adjacent core end and against each other to hold the core laminae in a compressed state.

3. In a device of the character described, the combination of a supporting member for a laminated core having concentrically disposed skewed inserted conductors; and movable members for engaging the core and conductor end respectively, one of the members engaging and bending protruding straight conductor ends against the adjacent core end and against each other upon movement of one member relative to the other member axially of the core, one of the members being rotatable about the core axis.

4. In a device of the character described, the combination of a floating support for a core having concentrically disposed skewed inserted conductors; and cooperating rams, said rams including inner and outer clamps, the outer clamp adapted to engage and bend protruding straight conductor ends at both core ends thereagainst, one of the rams having its outer clamp movable axially of the core and each ram being rotatable about the core axis the core being clamped between the inner clamps of the rams.

5. In a device of the character described, the combination of a support for a core having concentrically disposed skewed inserted conductors; a first ram movable axially of the core and providing a thrust bearing concentrically of the core; a second ram movable with the first ram for engaging and bending protruding straight conductor ends against the adjacent core end, said second ram having a lateral flange in seating engagement with the bearing; and a thrust pad on the first ram and extending into close proximity to the second ram, said pad being engaged by the second ram only upon deflection of the flange under a predetermined force transmitted from the first ram through the bearing and flange to the second ram.

6. In a device of the character described, the combination of movable and vertically aligned clamps for compressing a laminated core having concentrically disposed, skewed inserted conductors; means on the lower clamp for locating a core thereon; and a ram for bending protruding straight conductor ends against the adjacent core end upon relative movement between said ram and the compressed core axially of the latter, the ram being rotatable about the core axis.

7. In a device of the character described, the combination of relatively vertically movable, non-rotatable clamps for compressing a laminated core having inserted conductors; means on the lower clamp for locating a core thereon and preventing rotation of a few of the lower laminae; and means carried by the other clamp for turning the laminae except the non-rotatable ones about the core axis during relative approaching movement between the clamps, thereby twisting the laminated core and skewing the conductors.

8. In a device of the character described, the combination of relatively vertically movable, non-rotatable clamps for compressing a laminated core having inserted conductors and an eccentrically located hole through the core laminae; means on the lower clamp for locating a core thereon, said means including a semi-spherical projection to register with the core hole and prevent rotation of a few of the lower laminae; and a projection on the other clamp having a cam surface adapted to enter and cooperate with the core hole to turn the laminae except the non-rotatable ones about the core axis upon relative approaching movement between the clamps, thereby twisting the laminated core and skewing the conductors.

9. In a device of the character described, the combination of relatively vertically movable, non-rotatable clamps for compressing a laminated core having inserted conductors and an eccentrically located hole through the core laminae; provisions on the lower clamp for locating a core thereon and including means cooperating with the core hole to prevent rotation of some of the lower core laminae; a projection on the other clamp and having a cam surface adapted to enter and cooperate with the core hole to turn the laminae except the non-rotatable ones about the core axis upon relative approaching movement between the clamps, thereby twisting the laminated core and skewing the conductors; and means for angularly adjusting one of the clamps.

10. In a device of the character described, the combination of aligned clamps for compressing a laminated core having a central hole through the laminae, one clamp being movable and the other clamp being normally yieldingly urged toward said one clamp; a stop for said other clamp in home position at a certain minimum distance from said one clamp; and a stationary post extending through and beyond said other clamp in home position to receive the central core opening, the part of the post within said other clamp being of larger diameter than the part extending between both clamps and adapted accurately to align the central holes of the individual laminae while said one clamp depresses the other clamp from home position through the medium of the interposed core.

11. In a device of the character described, the combination of vertically aligned, non-rotatable clamps for compressing a laminated core having inserted conductors and a centrally and an eccentrically located hole through the laminae, the upper clamp being movable and the lower clamp being yieldingly urged toward the upper clamp; a stop for the lower clamp in home position at a certain minimum distance from the upper clamp; a stationary post extending through and above the lower clamp to receive the central core hole, the part of the post within the lower clamp in home position being of larger diameter than the part thereabove and adapted accurately to align the central holes of the individual laminae while the upper clamp depresses the lower clamp from home position through the medium of the interposed core; means on the lower clamp and cooperating with the eccentric core hole to prevent rotation of some of the lower laminae; and a projection on the upper clamp and having a cam surface adapted to enter and cooperate with the eccentric core hole to turn the laminae except the non-rotatable ones about the post upon movement of the upper ram into engagement with the core, thereby twisting the laminated core and skewing the conductors.

12. In a device of the character described, the combination of a support for a laminated core having skewed inserted conductors; a member movable axially of the core; a ram mounted on the member for rotation about the core axis and adapted to engage and bend protruding straight conductor ends against the adjacent core end; and a clamp yieldingly carried by the member and adapted to press the core laminae against the support prior to engagement of the ram with the conductor ends.

13. In a device of the character described, the combination of a yielding support for a laminated core having skewed inserted conductors; a member movable axially of the core; a first ram mounted on the member for rotation about the core axis and adapted to engage and bend protruding straight conductor ends against the adjacent core end; a clamp yieldingly carried by the member and adapted to press the core laminae against the support prior to engagement of the ram with the conductor ends, the yielding force of the support being greater than that of the clamp and greater than the force exerted by the ram for bending the adjacent conductor ends; and another ram rotatable about the core axis and adapted to be engaged by the protruding straight conductor ends at the other core end and to bend the same thereagainst upon depression of the support by the moving member and interposed first ram and core.

14. In a device of the character described, the combination of a yielding support for a laminated core having skewed inserted conductors and a central hole through the laminae; a member movable axially of the core; a first ram mounted on the member for rotation about the core axis and adapted to engage and bend protruding straight conductor ends against the adjacent core end; a clamp yieldingly carried by the member and adapted to press the core laminae against the support prior to engagement of the ram with the conductor ends, the yielding force of the support being greater than that of the clamp and greater than the force exerted by the ram for bending the adjacent conductor ends; another ram rotatable about the core axis and adapted to be engaged by the protruding straight conductor ends at the other core end and to bend the same thereagainst upon depression of the support by the moving member and interposed first ram and core; and means accurately aligning the central holes of the individual laminae during depression of the support and prior to engagement of said other ram with the adjacent conductor ends.

15. In a device of the character described, the combination of a vertically yielding non-rotatable support for a laminated core having inserted conductors and a centrally and an eccentrically located hole through the laminae; means cooperating with said eccentric hole for angularly locating a few of the lower laminae on the support; a member movable axially of the core; a first ram mounted on the member for rotation about the core axis and adapted to engage and bend protruding straight conductor ends against the adjacent core end; a non-rotatable clamp yieldingly carried by the member and adapted to press the core laminae against the support prior to engagement of the ram with the conductor ends, the yielding force of the support being greater than that of the clamp and greater than the force exerted by the ram for bending the adjacent conductor ends; a projection on the clamp and providing a cam surface adapted to enter and cooperate with the eccentric core hole to turn all except the angularly located laminae about the core axis during movement of the clamp into engagement with the core, thereby twisting the laminated core and skewing the conductors; another ram rotatable about the core axis and adapted to be engaged by the protruding straight conductor ends at the other core end and to bend the same thereagainst upon depression of the support by the moving member and interposed first ram and core; and means accurately aligning the central holes of the individual core laminae during depression of the support and prior to engagement of said other ram with the adjacent conductor ends.

16. In a device of the character described, the combination of a supporting member for a core having concentrically disposed skewed inserted conductors; ram means including two coaxial members, the inner member adapted to engage the core and the outer member engaging and bending protruding straight conductor ends against the adjacent core end upon movement of the members axially of the core, the outer member being rotatable about the inner member; and means cooperating with the ram members to form an annular groove in which the conductor ends are bent into a circular ring of overlapping ends.

17. A device for anchoring inserted conductors to a laminated core, comprising in combination; a stationary member; a floating work holder slidably supported on the stationary member for receiving a laminated core; a ring-shaped clamp secured to the holder; a ram yieldingly supported from the stationary member and extending through the clamp, said ram cooperating with the clamp and holder to form an annular groove to receive the ends of the conductors; and means operable upon the core urging the ram toward the stationary member a certain distance whereby the laminations of the core are compressed and causing the ring-shaped clamp to be rotated relative to the ram and bend the conductor ends against the core and in an overlapped relation within the annular groove to form a continuous end ring, the bending of the conductor ends maintaining the laminated core in its compressed state.

18. A device for completing the assembly of a rotor for electric motors comprising, in combination, a support for a loosely assembled core and conductors in the slots thereof; means for causing the protruding portions of the conductors to be located obliquely with respect to the planes of the ends of the core; and means engageable with the ends of said protruding conductor portions and movable longitudinally relative to the core to cause said portions of the conductors to be bent against the core.

19. A device for completing the assembly of a rotor for electric motors comprising, in combination, a support for a loosely assembled laminated core and conductors in the slots thereof; means for causing the protruding portions of the conductors to be located obliquely with respect to the planes of the ends of the core; means for compressing the laminae together; and means operative while the compressing means is operative to cause the protruding conductor portions to be bent against the ends of the core to hold the core laminae in compressed relation.

20. A device for anchoring inserted conductors to a laminated core comprising in combination a core support; means for skewing the conductors; means for compressing the core laminae together; and means rotatable with respect to the support for bending the exposed ends at both core ends in the direction of the skew against each other and against the ends of the core.

21. A device for anchoring inserted conductors to a laminated core comprising, in combination, a core support; means for bending the protruding conductor ends against the core; means for skewing the laminations of the core a predetermined amount prior to the bending of the conductors against the core; and means for maintaining the laminae in the said predetermined skewed condition while the conductors are bent against the core.

GEORGE W. ELSEY.